(12) United States Patent
Ha

(10) Patent No.: US 7,490,535 B2
(45) Date of Patent: Feb. 17, 2009

(54) WRENCH

(75) Inventor: Yong Su Ha, #201-1204 Surisan Hyundai Apt., 1062-2, Anyang-dong, Manan-gu, Anyang-si, Gyeonggi-do (KR)

(73) Assignee: Yong Su Ha, Anyang-si, Gyeonggi-do (KR)

( * ) Notice: Subject to any disclaimer, the term of this patent is extended or adjusted under 35 U.S.C. 154(b) by 0 days.

(21) Appl. No.: 11/925,707

(22) Filed: Oct. 26, 2007

(65) Prior Publication Data

US 2008/0098856 A1 May 1, 2008

(30) Foreign Application Priority Data

Oct. 26, 2006 (KR) ...................... 20-2006-0028477
Mar. 9, 2007 (KR) ...................... 10-2007-0023429

(51) Int. Cl.
*B25B 17/02* (2006.01)
(52) U.S. Cl. .................... 81/475; 81/57.36; 81/57.5
(58) Field of Classification Search ............. 81/57.36, 81/57.3, 57, 57.24, 57.4, 57.41, 475
See application file for complete search history.

(56) References Cited

U.S. PATENT DOCUMENTS

| | | | | |
|---|---|---|---|---|
| 3,979,965 A | * | 9/1976 | Vuceta | 74/410 |
| 4,063,475 A | * | 12/1977 | Perkins | 81/57.22 |
| 5,176,047 A | * | 1/1993 | Bai et al. | 81/57.3 |
| 6,742,417 B2 | * | 6/2004 | Ha | 81/57.36 |

* cited by examiner

*Primary Examiner*—Joseph J. Hail, III
*Assistant Examiner*—Anthony Ojini
(74) *Attorney, Agent, or Firm*—Joseph H. Kim; JHK Law

(57) ABSTRACT

This invention is about a device used for installing a fixing nut on the targeted objects-multiple fixing screw axes protruded from the hub or for separating them from the targeted object or the fixing screw axis in order to fix vehicle's tire wheel to the hub when installing or separating a fixing nut from targeted objects. Based on the idle operation of the operating gear, not based on the visual examination, the invention immediately recognizes the complete installation of a fixing nut. Likewise, this invention is to provide a wrench that maximizes user convenience.

3 Claims, 11 Drawing Sheets

WRENCH

BACKGROUND OF THE INVENTION

1. Field of the Invention

The invention is related to a wrench. To give more details, when installing or separating a fixing nut on or from the targeted objects, the invention could be used to install a fixing nut on multiple screw axes protruded from the hub in order to fix the tire wheel to the hub or to separate a fixing nut from the fixed screw axis. This invention is pertaining to a wrench of maximizing convenience by immediately recognizing the complete installation of a fixing nut based on the idle operation status of the operating gear, not based on the visual examination.

2. Background of the Related Art

The device is used to tighten or loosen a fixing nut or to fasten or loosen the nut fixed to the tire wheel hub of a vehicle. In general, in this case, a wrench is used. The applicant has been already granted a U.S. Pat. (No. 6,742,417) (hereafter 'existing technology') for a device of fastening or loosening a fixing nut with less energy in a prompt manner designed for female and elderly users.

The existing technology is as follows:

While the connecting part and the main socket are assembled, the main socket is assembled with the target nut to be loosened or tightened, and auxiliary socket is assembled with other nut.

Afterwards, when rotating the handle to make the operation axis spin, due to the strengthened spinning power of the transmission means including first transmission and second transmission, rotation is conducted to easily loosen or tighten the target nut.

Meanwhile, the torque spring installed to support the resilience between the gripping tube's inside wall and rod is compressed only to a certain level until the target nut is completely fastened.

To the contrary, the operating axis does not spin any more after the target nut is completely fastened. In this situation, if a force bigger than the repulsive power of the torque spring is applied to the handle for spinning, the torque spring is compressed to the maximum level, and the gripping tube's inside wall and the outside surface of the rod become the closest.

This work process requires the user to check the level of the torque spring compression visually through the opening at the end of the gripping tube in order to tighten the target nut. Therefore, users will experience lots of inconvenience in tightening the target nut.

In addition, when the target nut is completely fastened, the operating axis does not spin any more. If the torque spring is compressed to the maximum level by applying a force bigger than the repulsive power of the torque spring to the handle, it often happens that the end of the gripping tube does not have a consistent direction, and it is headed downward sometimes. In this case, the user finds it difficult to make a visual check.

SUMMARY OF THE INVENTION

The invention is related to a wrench. To give more details, when installing or separating a fixing nut on or from the targeted objects, the invention could be used to install a fixing nut on multiple screw axes protruded from the hub in order to fix the tire wheel to the hub or to separate a fixing nut from the fixed screw axis. This invention is pertaining to a wrench of maximizing convenience by immediately recognizing the complete installation of a fixing nut based on the idle operation status of the operating gear, not based on the visual examination.

To fulfill the objective as stated above, Embodiment 1 of the invention comprises a cylindrical case 10 with an open end 12 and a support wall 14 with a rotation guide pass hole 13 a diameter of which is smaller than that of the open end 12: a cap 20 detachably connected to the open end of the cylindrical case, said cap 20 having a rotation guide pass hole 21 in the center: initial input axis 60 inserted movably back and force in the rotation guide pass hole 21 of the cap 20, one end of the initial input axis 60 positioned inside of the cylindrical case 10 having a first flange part 61 with jagged outer surface 62 and the other end of the initial input axis 60 positioned outside of said cap 20 being connected to a operation handle 80, 80A: an operating gear 63 installed inside the cylindrical case 10, said operating gear 63 having a gear part on its circular outer surface and having a second flange part 64 with jagged outer surface 65 that allows engaging with the jagged outer surface 62 of the initial input axis: a final rotating axis 45 installed in the rotation guide pass hole 13, said final rotating axis 45 being rotated by torque of the operating gear 63 transmitted through torque increasing means 40, one end of said final rotating axis 45 protruding out of the rotation guide pass hole 13 and connected to a socket 50; elastic means 70 installed on the outer surface of the initial input axis 60 between said cap 20 and the first flange part 61 for elastically supporting engagement between the jagged outer surface 62 of the first flange part 61 and the jagged outer surface 65 of the second flange part 64; initial input axis movement binding/release means 90 for selectively enabling and disabling the forward and backward movement of the initial input axis 60 while enabling rotation of the initial input axis 60; whereby, incline angle comprising the jagged outer surface 62, 65 of the initial input axis 60 and the operating gear 63 meets a condition in which when tightening nuts or bolts to object, the operating gear 63 would rotate together with the initial input axis 60 with the jagged outer surfaces 62, 65 engaged due to elastic force of the elastic means 70 and when the nuts or bolts tightened to the object, the jagged outer surfaces 62, 65 disengaged overcoming the elastic force of the elastic means 70.

Preferably, the elastic means 70 comprises a pair of disk springs 71, 72 with a piercing hole 71a, 72a through which the first operation axis 60 passes, the disk springs 71, 72 being formed tapered to have central parts of them be separated and edges of them be contacted.

Preferably, the initial input axis movement binding/release means 90 comprises: a piercing hole 91 formed on the cap 20 in an orthogonal direction of the initial input axis 60, said piercing hole 91 forming a passageway 91a communicating with the rotation guide pass hole 21 of the cap 20; a lever part 93 installed rotatable in the rotation guide pass hole 21 with both ends of it projected outside of the cap 20, said lever part 93 having a concave part 92 not to be interfered with inside circular area of the rotation guide pass hole 21; a movement binding groove 94 formed around the outer surface of the initial input axis 60, said movement binding groove 94 selectively contacting with the lever part 93 in accordance with a rotation state of the lever part 93; whereby, when the lever part 93 is rotated in the state of its outward surface projected into the movement binding groove 94, the forward and backward movement of the initial input axis 60 is disabled, and when the lever part 93 is rotated in the state of the concave part 92 directed toward the movement binding groove 94, the forward and backward movement of the initial input axis 60 is enabled.

According to embodiment of the invention, the installation of the fixing nut could be immediately recognized based on the idle rotation status of the operating gear, instead of the visual examination when installing the fixing nut. This maximizes user convenience and can be applicable to both the type installed counterclockwise. Therefore, the installation and separation of a fixing nut could be easy and simple.

In the meantime, the wrench under Embodiment has a cylinder-shaped case that has an opening on one side and a rotary guide hole smaller than the opening on the other side. There is a cap that can be attached to or removed from the opening of the case, and that has a rotary guide hole at the center. It inserted into the above cap's guide hole so that forward and backward movement and rotation are possible. Therefore, one side is located within the opening of the cap above, and the other side is outside the case. On the other side, an operating handle of a certain length is installed. On one side, the initial input axis with prominence and depression is created. Around the outer circumference, the gear part is created. To make the prominence and depression of the initial input axis combined with the mutual prominence and depression, the prominence and depression is created. It is inserted into the operating gear that rotates inside the case and the rotary guide on the supporting wall to make it protruded from the other side of the case. In addition, it is assembled with the socket that rotates the fixing nut on the targeted objects forward and backward according to the rotary direction. There is a final output axis that rotates the socket above. To support the combination of prominence and depression between the initial input axis and the operating gear, the elastic means installed on the circumference of the initial axis inside the cap should be included. The slant of the prominence and depression parts that form the initial input axis and operating gear is affected by the condition where the operating gear is rotated by the elastic power of the elastic means when the initial input axis is rotated in the direction of fixed nut installation. In case where it does not rotate in the direction of installing the fixed nut on the targeted object, the compression power of the elastic means make the prominence and depression of the above operating gear contact the prominence and depression of the initial axis. In this case the initial input axis makes idle operation against the above operating gear. In the case where rotation cannot take place in the direction of installing the above fixed nut on the targeted object, if the initial input axis rotates backward in the direction of separating the fixed nut from the targeted object, a slant is created to make the operating gear rotate due to the resilience of the elastic means.

According to Embodiment 2 of the invention, instead of visual examination, the status of idle rotation of the operation gear becomes an indicator of the completion of the fixing nut installation when installing the fixing nut. This maximizes user convenience. In addition, this can be selectively applied to the type that rotates clockwise against the fixing nut axis or the type that rotates counter-clockwise to make the installation and separation of a fixing nut much easier.

According to the invention, the wrench has following effects.

First, when installing or detaching a fixing nut, this device functions based on the idling condition not the idling time of the operating gear. Accordingly, it could maximize the convenience of the user by promptly detecting if the install process is completed. For example, when fixing a tire wheel, this device can be used to install or detach nuts in screw axes that are projected from the hub.

Second, this device makes you easy to install or detach the nuts in the screw axis by setting either clockwise or counterclockwise rotation.

Third, this device makes you easy to install or detach the nuts in screw axis regardless of clockwise or counterclockwise rotation.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
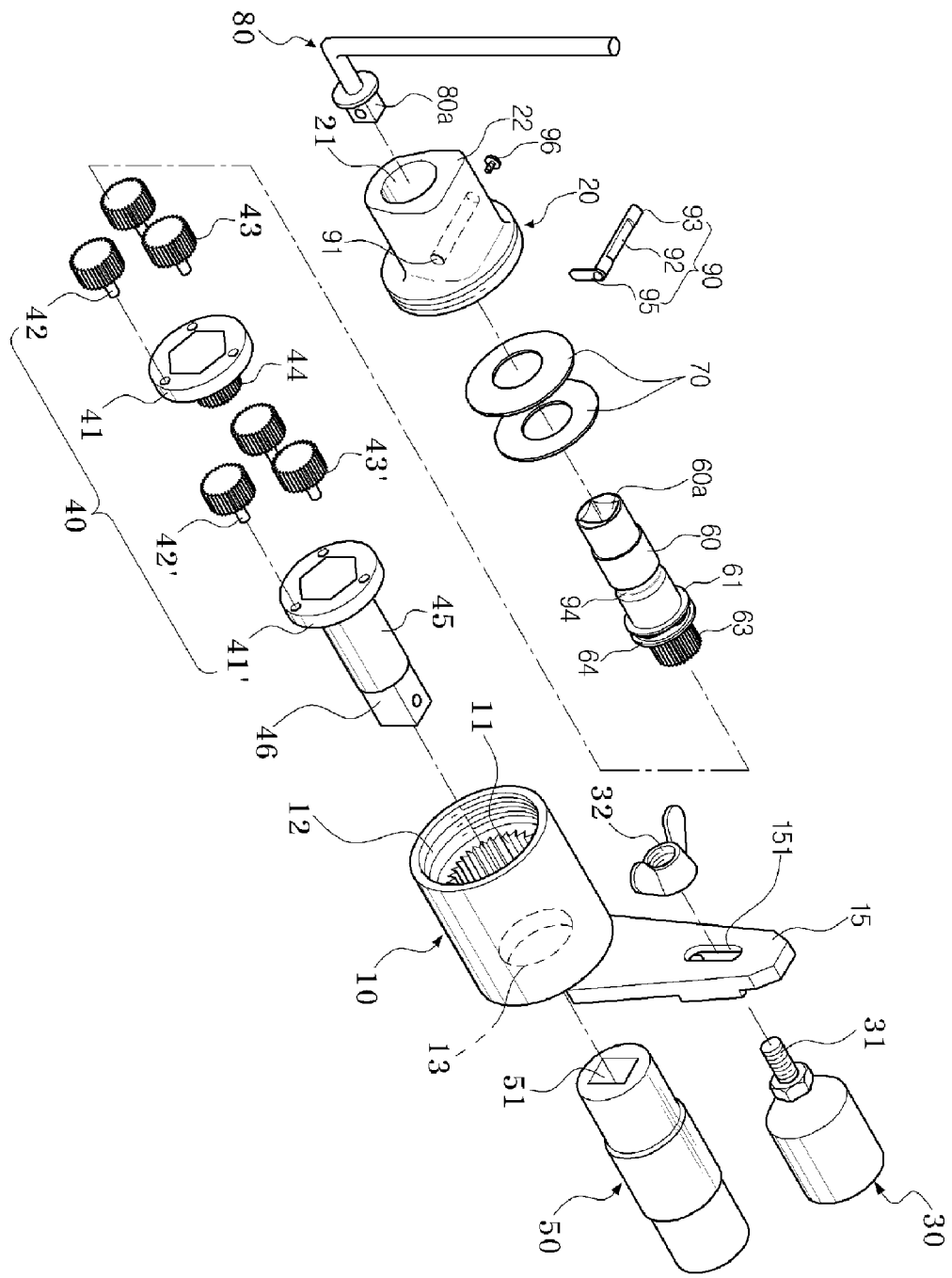
FIG. 1 is a disjointing exploded view that applies and illustrates the first enforcement example of torque increasing means of composition of wrench by invention that see.
Figure 2:
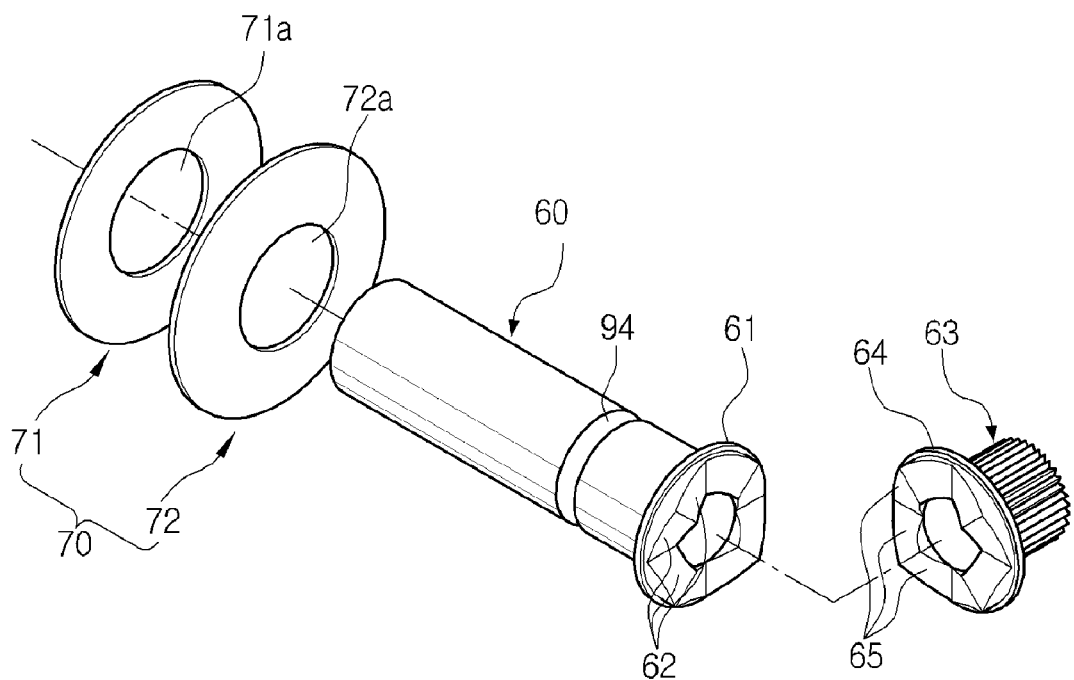
FIG. 2 is a disjointing exploded view that disjoints and illustrates first operation axis and movable gear drawn and elasticity means that is illustrated in FIG. 1.

A detailed structure of the present invention will now be described with reference to the accompanying drawings. In the following description, same drawing reference numerals are used for the same elements even in different drawings.

The first operation of this invention demonstrates the convenience and the usability of the device. In installing or detaching a fixing nut, the device functions based on the idling condition not the idling time of the operating gear so that it could maximize the convenience of the user by promptly detecting when the install process is finished. For example, when fixing a tire wheel, this device can be used to install or detach nuts in screw axes that are projected from the hub. In addition, this invention makes you easy to install or detach the nuts in screw axis regardless of clockwise or counterclockwise rotation.

Figure 10:
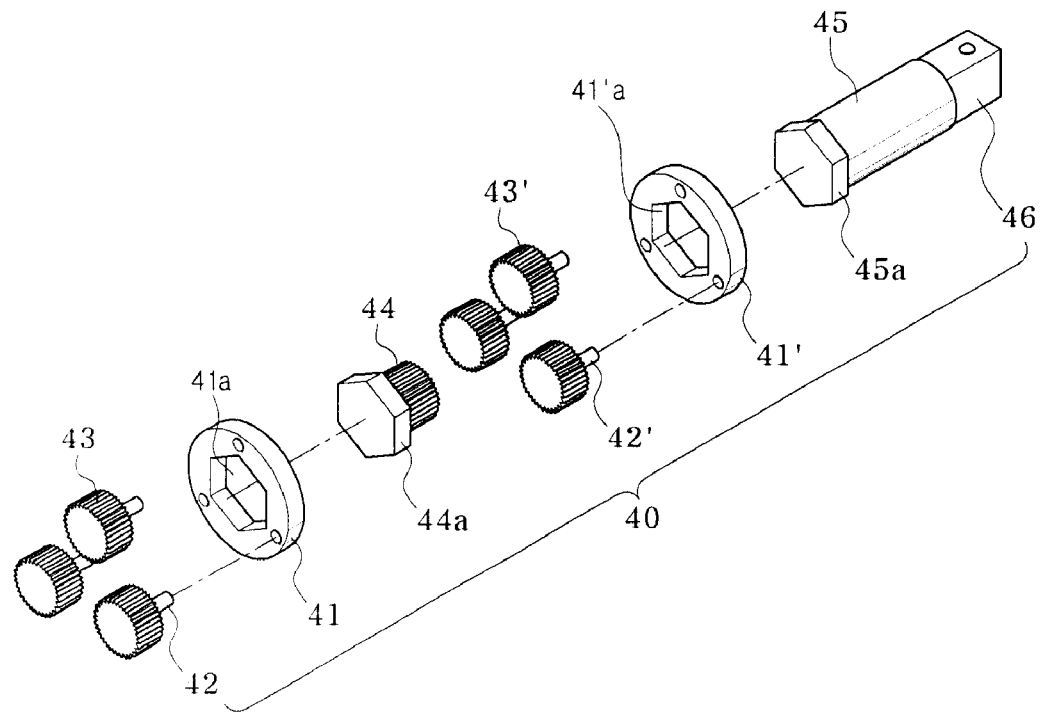
FIG. 10 is a disjointing exploded view that extracts and illustrates union structure of the first rotation plate and center gear and union structure of the second rotation plates and final output axis among disjointing exploded view that is illustrated FIG. 1.
Figure 11:
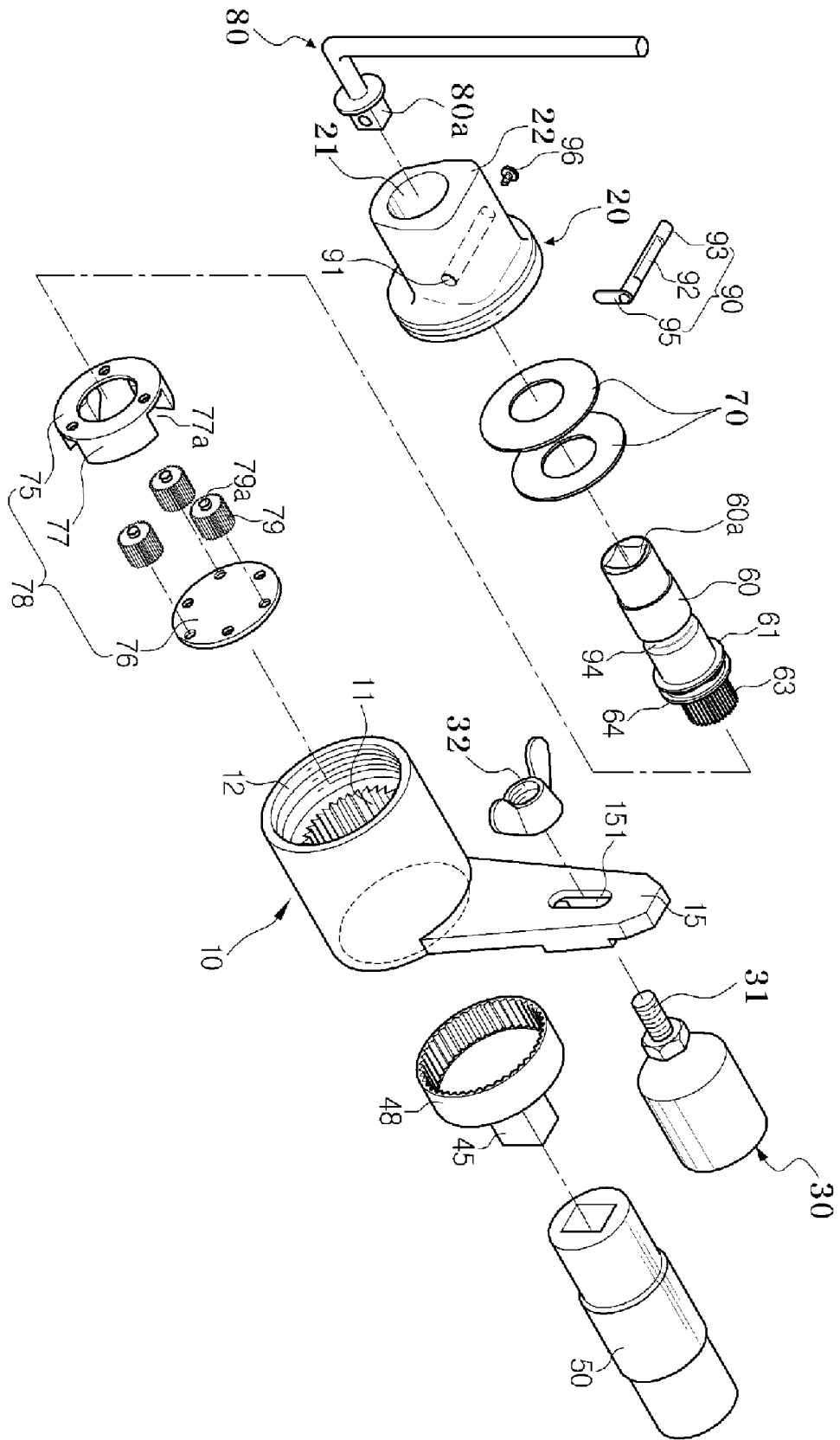
FIG. 11 is a disjointing exploded view that applies and illustrates second enforcement example of torque increasing means of composition of wrench by the first enforcement example of invention that see.

As illustrated in FIGS. 1 and 10, the wrench roughly consists of seven components: a cylindrical case (10), a cap (20), a primary input axis (60), an operating gear (63), an output axis (45), an elastic shift (70), and a static constraint/enabling shift of the primary axis.

One side of the case (12) has an opening and the other side has a bearing wall (14) with a revolving guide perforation (13), which is smaller than the opening (12).

The cap (20) connected to the opening (12) of the case (10) is detachable and the revolving guide perforation (21) pass through the center. The cap (20) is attached to or detached from the inner surface of the opening (12) as a screw type.

The primary input axis (60) is inserted to the revolving guide perforation to move back and forth and rotate. One end of the axis is placed at the opening (12) of the cap (20). As shown in picture 9, in the case of rotating the initial insert axis (60) to the opposite direction from the fixed bolt when the fixed bolt does not move anymore because it is touching the surface of the wheels of a tire, a stop restriction (90) is used to keep the initial insert axis (60) moving in the rotating route (21) of the cap (20) to keep the movable gear (63)'s joint (65) connected to the initial inserting axis (60)'s joint (65). The other end of the axis is placed outside the case to allow a maneuver grip to install.

This jagged surface (62) forms zigzag pattern in a gentle angle of inclination. For example, the angle of inclination between the surfaces that forms the jagged surface (62) can be 120 degrees (an obtuse angle) so that the angle between the first flanged eyelet (61) and the inclined plane becomes 30 degrees, however, the angle is not necessarily restricted to this criterion.

The operating gear (63) is formed at outer cylinder surface. The second exhibition of the increased rotating power using this device is shown, as in picture 11: an internal gear part (11) regularly seen along the inner surface of the case (10); a circular board (75) in front, with the movable gear (63) penetrating its center while spinning, a circular board at the back (76), an inner case (78) with several exposing holes (77a) on its rims (77) that will hold the two circular boards together; a set of gears (79) which goes through the said circular board in front (75), gradually combine with the automatic gears (63), and half of which will join the inner gear part (11) as it is installed based on the axis pin (79a) inside the inner case (78) so that some of its parts will be exposed through the exposure openings (77a), and a ring-type gear (28), that encompasses the rest of the other gear (79) at the very end of the final axis that is opposite to the circular board (76). The gear (63) revolves inside the case (10).

Above jagged surface (65) is connected to the jagged surface (62) of the primary input axis and forms zigzag pattern in a gentle angle of inclination. For example, the angle of inclination between the surfaces that forms the jagged surface (65) can be 120 degrees (an obtuse angle) so that the angle between the first flanged eyelet (61) and the inclined plane becomes 30 degrees, however, the angle is not necessarily restricted to this criterion.

The elastic shift (70) is placed at the primary input axis (60) between the cap (20) and the first flanged eyelet (61) to bear the connection between the input axis (60) and the operating gear (63) elastically.

The elastic shift (70) has perforations (71a) (72a), which the primary input axis (60) passes through to make contact with each other. It slides on the input axis (60) inside the cap (20), tapers as the center has a disparity, and consists of a pair of elasticized disc springs (71) (72).

Here, if the external force is not applied toward the center of the disc springs (71) (72), the center having a disparity provide a restitution force and transfers the torque of the primary input axis (60) to the operating gear (63). If the external force, which is generated when the device does not rotate by contacting the nuts with the wheel surface, is applied to the center, it provides the elasticity to idle the operating gear (63) even when the primary input axis (60) is rotating.

Each jagged surface (62) (65) that composes the primary input axis (60) and the operating gear (63) are beveled to fulfill two conditions: 1) to make the operating gear (63) rotate by the restitution force of the elastic shift, which is generated when the primary input axis (60) is rotating toward the target; 2) to make the primary input axis (60) idle by a compression force of the elastic shift (70), which is generated when the jagged surface (66) of the operating gear (63) contacts the jagged surface (62) of the primary input axis (60).

As illustrated in FIGS. 2-4, 7-9, each jagged surface (62) (65) that composes the primary input axis (60) and the operating gear (63) forms zigzag pattern in a gentle angle of inclination. This angle can be modified as far as it fulfills the condition 1) and 2).

Since the inclination angle of the jagged surface is devised to fulfill the condition 1) and 2), the static constraint/enabling shift of the primary axis (90) should be fully equipped to keep the jagged surfaces (65) (62) of the operating gear (63) and the primary input axis (60) tight and allows the primary input axis (60) to rotate in either direction inside the revolving guide perforation (21) of the cap (20), in case the primary input axis (60) backlashes after the installation of the nut is completed.

The initial input axis halt binding/release device (90) of this invention consists of: a penetration hole (91), made to go through the cap (20) orthogonally from the axis of the initial input axis (60) to create a connection passage (91a) that is connected to the rotation guidance hole (21) interior; Lever supplements (93), with a concave part (92) that was created to be inserted within the penetration hole (91) so that it could be rotated, leaving both sides of the cap (20) to protrude, and so that rotation guidance hole (21) would not be interfered by the part corresponding to the connection hole (91a); and finally, the semicircle shaped halt binding groove (94) that is created along the rotation guidance hole (21) corresponding to the interior of the initial input axis (60) and also the linearly contacting the exterior of the lever supplements (93) protruded inside the rotation guidance hole (21) of the cap (20) through the connection passage (91a).

Also, the initial input axis halt binding/release device (90) is created to satisfy: condition 3, which specifies that when the lever supplements (93) is inserted within the penetration hole (91) and rotating, the exterior of the lever supplements (93) protruding into the cap (20)'s rotation guidance hole (21) through the connection passage (91a) and linearly contact the interior of the halt binding groove (94); condition 4, which specifies that when the initial input axis (60) is rotating, the exterior of the lever supplements (93) protruding into the cap (20)'s rotation guidance hole (21) through the connection passage (91a), linearly contacting it; and finally condition 5, which specifies that when the initial input axis (60) moves front and back in the rotation guidance hole (21) of the cap (20), parts of the initial input axis (60) should be created so that it goes through the interior of the mouth (92).

Here, the unexplained sign (95) is the handle that is created at the end of the lever supplements (93) so that the user may rotated it, and the unexplained sign 96 is the fixation screw that is installed in the other end of the lever supplements (93) protruding from the cap (20)'s rotation guidance hole (21).

Above mentioned handle part (95) and fixation screw (96) will prevent the length movement of the lever supplements (93), when inserted into the rotation guidance hole (21).

However, in this invention, the rotational power of the above mentioned operational gear (63) is delivered to the above mentioned final output axis (45). This rotational power increase device (40) can have two types of practical application examples.

The rotational power increase device (4) of the first practical application example, as shown in FIG. 1, is commonly combined with the internal gear box (11) created in the length way of the interior of the case (10); $1^{st}$ rotation plate (41) that is placed within the case (10), allowing it to be rotational; and the many $1^{st}$ Double-Planetary gears (43) that is placed so that it could rotate according to the axis pin (42) which is installed in front of the $1^{st}$ rotation plate so that it can be combined with the above mentioned internal gear box (11) along with commonly combining with the operational gear (63); main gear (44) created in the back center of the $1^{st}$ rotation plate (41); the $2^{nd}$ rotation plate (41'), that is separated from the $1^{st}$ rotation plate (41) created in the foot area of the final output axis (45) corresponding to the main gear (44) within the interior of the case (10), so that it could rotate; and finally many $2^{nd}$ Double-Planetary gears (43') that is placed so that it could rotate according to the axis pin (42') which is installed in front of the $2^{nd}$ rotation plate (41') so that it can be combined with the above mentioned internal gear box (11);

Within the structure of the above mentioned rotational power increase, the axis pin (42) that allows the rotation of the Double-Planetary gear (43) in relation to the $1^{st}$ rotation plate (41), is a protrusion from the $1^{st}$ rotation plate (41), and likewise, the axis pin (42') that allows the rotation of the $2^{nd}$ Double-Planetary gear (43') in relation to the $2^{nd}$ rotation plate (41'), is also a protrusion from the $2^{nd}$ rotation plate (41'), but was not specified on the plan.

Also, within structure of the above mentioned rotational power increase device (40), the axis pin (42) that allows the rotation of the $1^{st}$ Double-Planetary gear (43) in relation to the $1^{st}$ rotation plate (41) is created to protrude from the $1^{st}$ Double-Planetary gear (43), and the axis pin (42') that allows the rotation of the $2^{nd}$ Double-Planetary gear (43') in relation to the $2^{nd}$ rotation plate (41') can be created to protrude from the $2^{nd}$ Double-Planetary gear (43') (refer to FIG. 1).

Here, the unexplained sign 46 is the combining part that is created on the final output axis (45) so that it could be combined with various grooves (51) that is made on the end of the socket (50).

So, according to the above mentioned invention's first practical application example, the rotation power increase device (40)'s mechanism works as follows.

First, when the operational gear (63) moves either clockwise, or anti-clockwise, the many $1^{st}$ Double-Planetary gear (43) combined to this operational gear (63) will rotate and revolve around it.

As mentioned above, as the $1^{st}$ Double-Planetary gear (43) rotates, the $1^{st}$ rotation plate (41) rotates in the same direction as the revolution of the many $1^{st}$ Double-Planetary gear (43).

Through such procedure, it will be shifted (decreased) according to the gear ratio of the operational gear (63) and the $1^{st}$ Double-Planetary gear (43), so the $1^{st}$ rotation plate (41) will rotate slower than the initial input axis (60), but the rotation power will be greater than the initial input axis (60).

As above, when the $1^{st}$ rotation plate rotates, the main gear installed on it will rotate in the same direction as the $1^{st}$ rotation plate.

When the main gear (44) rotates as above, the many $2^{nd}$ Double-Planetary gear (43'), combined to the main gear (44) will rotate and revolve around the main gear (44).

So, when the $2^{nd}$ Double-Planetary gear (43') rotates and revolves, the $2^{nd}$ rotation plate (41') will rotate in the same direction as the main $2^{nd}$ Double-Planetary gear (43').

At this instance, the $2^{nd}$ rotation plate (41') will be shifted (decreased) according to the gear ratio of the main gear (44) and the $2^{nd}$ Double-Planetary gear (43'), so it may rotate slower than the $1^{st}$ rotation plate, but the rotational power will be greater.

So finally, the final output axis (45), fixed onto the $2^{nd}$ rotation plate (43'), will rotate in the same direction as the $2^{nd}$ rotation plate (43'), and through the socket (50), will rotate the fixed nut.

According to the rotational power increase device (40), the first practical application example, the final output axis (45) will rotate with a greater rotational power than the initial input axis (60), and thus rotate the fixed nut with less power.

Along so, the rotation direction of the fixed nut will changed according to the rotation direction of the operational gear (63).

Also, as shown on FIG. 10, the above rotational power increase device (40), a pentagonal penetration hole (41a) in the middle of the $1^{st}$ rotation plate (41), as an example, or a polygonal hole (41a) in the main gear (44) can be created to be combined using a combination part (44a) with a pentagonal exterior.

Also, as shown on FIG. 10, the above rotational power increase device (40), a pentagonal penetration hole (41'a) in the middle of the $2^{nd}$ rotation plate (41'), as an example, a combination part (45a) can be created with a pentagonal exterior so that the combination part in the final output axis (45) can be joined with the $2^{nd}$ rotation plate (41').

Figure 12:
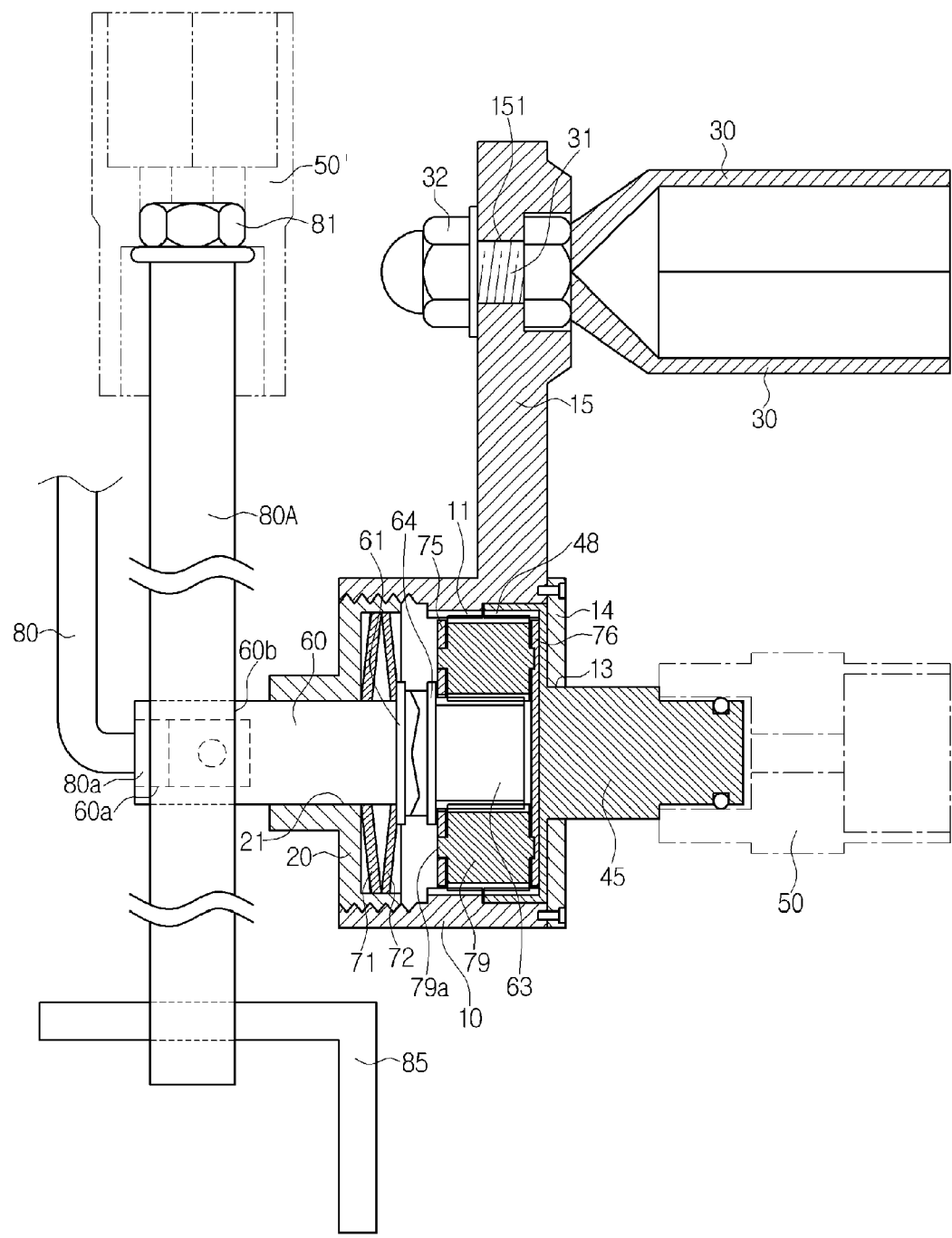
FIG. 12 is a cross-sectional view that illustrates conjointness and operation state of wrench that is illustrated to FIG. 11.

Meanwhile, as the FIG. 12 illustrates, by going through the piercing hole (60b) formed on the end part of the first operation axis (60), the operation handle (80A) is installed with the first operation axis (60) that is orthogonal to the operation handle (80A). And on the end part of the operation handle (80A), the jointing part that is to be connected with the socket (50) is formed. And then, on the end part of the operation handle (80A), the assistance operation handle (85) that is orthogonal to the operation handle (80A) is connected with the operation handle (80A) through piercing connection, in order to be able to be manually connected and disconnected.

The reason to connect the socket (50) with the said operation handle (80A) is that one can still use the operation handle (80A), though temporarily, in case the invented wrench breaks down during the process of tightening or loosening the fixation nut using socket (50). And also, one can still use the operation handle (80A) before tightening the fixation nut by wrench completely or after loosening the completely tightened fixation nut and then connecting socket (50') with the fixation nut. And the main purpose of the operation handle (80A) is for rotating the first operation axis (60) that is a part of the wrench. Here, as the FIG. 1 and FIG. 12 illustrate, and also as explained earlier, the jointing part (80a) can be structurally changed in order to be inserted into the concaved square shape groove (60a) on another end part of the first operation axis (60), without connecting the operation handle with the first operation axis (60).

In other words, one can choose to use or not to use the operation handle (80) in accordance with the situation.

Figure 3:
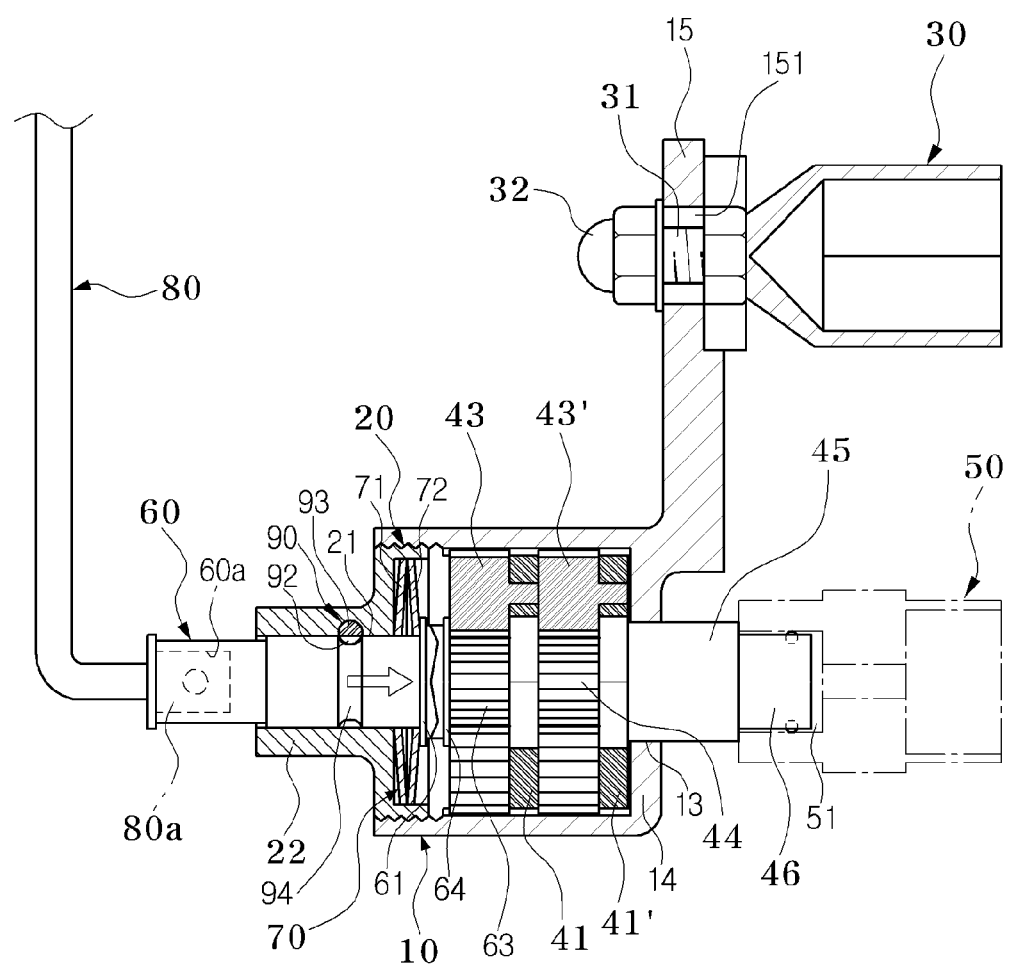
FIG. 3 and FIG. 4 is a cross-sectional view that illustrates conjointness and operation state of wrench that is illustrated in FIG. 1.
Figure 4:
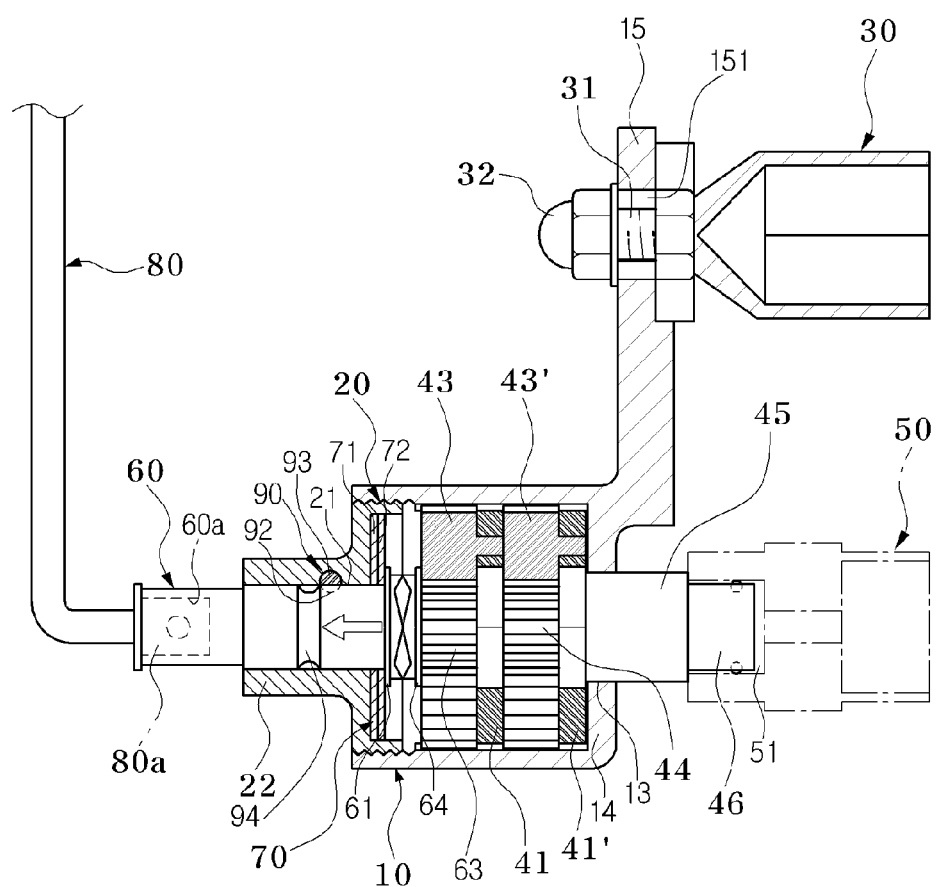
Figure 5:
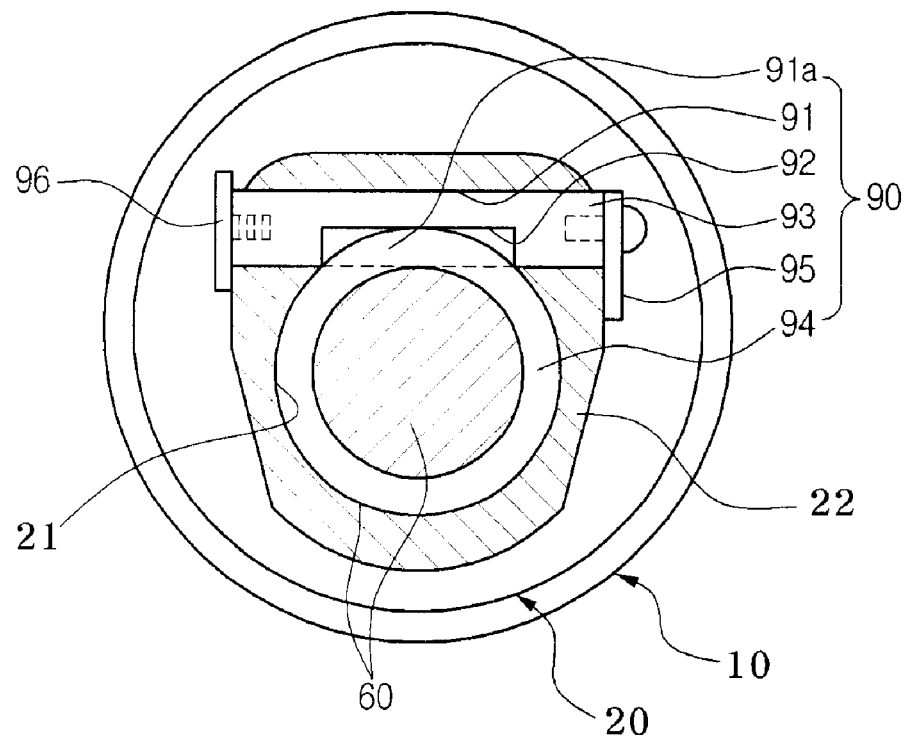
FIG. 5 and FIG. 6 is a cross-sectional view that illustrates operation state of first operation axis the movement binding/release means that is illustrated to FIG. 1 and different view conjointness.

Meanwhile, as the FIG. 1 and FIG. 3 illustrate the first enforcement example of the invention, firstly make the supporting stand (15) that has a certain length and orthogonal to the outer surface of case (10), and then make the long hole (151) on the end part of this supporting stand (15).

Next, fix the fixation socket (30) by the cap nut (32) after inserting the volt (31) that is projected from the separate fixing socket (30) into this long hole (151).

Here, the fixation socket (30) is not used for the same purpose as the said socket (50). Hence, the fixation nut to connect the socket (50) with the fixed clamp screw axis and to disconnect the socket (50) from the fixed clamp screw axis is inserted into the socket (50), while one fixation nut among many projected fixation nuts that are fixedly connected to the fixed clamp screw axis is inserted into the fixation socket (30).

And, the reason to form the long hole (151) is to control the distance between the fixation socket (30) and the socket (50), because the space between fixation nuts of car varies from one car to another.

Herewith, one can easily connect to the fixed clamp screw axis the fixation nut that is inserted into the socket (50) using the special supporting stand (15) and the fixing socket (30). And also one can easily disconnect the fixation nut from the fixed clamp screw axis.

The action of the first enforcement example of the invention will be explained below.

Here, the action of the first enforcement example of the invention will be explained by using the first enforcement example of torque increasing means.

If one rotates the lever part (93) in order to connect the concave part (92) of the lever part (93) with the passageway (91a), the first operation axis (60) can move forward or backward in the rotation guide piercing hole (21) of the cap (20). This is because the first operation axis (60) is designed to pass through the inside of the preceding concave part (92).

At the time, because the central part of the pair of disk spring (71) (72) that compose the elasticity means (70) is separated, the power transfer route that receives the torque of the first operation axis (60) and then can rotate the movable gear (63) will be formulated while the convex part (62) of the first operation axis (60) and the convex part (65) of the operation gear (63) are mutually concave-convex connected.

If a user rotates the operation handle (80) (80A) in this situation, the first operation axis (60) is rotated. And because at this moment, the convex part (62) of the first operation axis (60) and the convex part (65) of the movable gear (63) are mutually concave-convex connected, the torque of this first operation axis (60) can rotate the operation gear (63).

Figure 7:
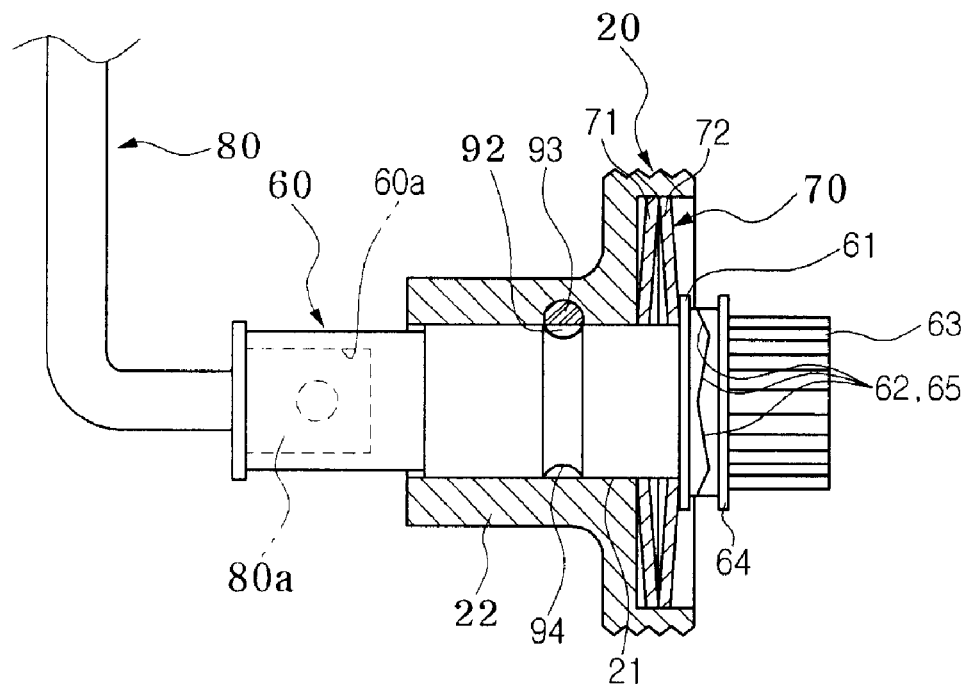
FIG. 7 through FIG. 9 is a part extension cross-sectional view that displays operation relation of convex part between first operation axis the movement binding/release means and elasticity means and first operation axis and movable gear that is illustrated FIG. 3.

That is to say that until the socket (50) is firmly fixed to an object, the convex part (62) of the first operation axis (60) and the convex part (65) of the movable gear (63) can continuously maintain the state of being mutually concave-convex connected using the elasticity means (70) without relying on a big force.(Refer to the FIG. 7)

Therefore, a big force is not required, until the socket (50) is firmly fixed to an object.

Figure 8:
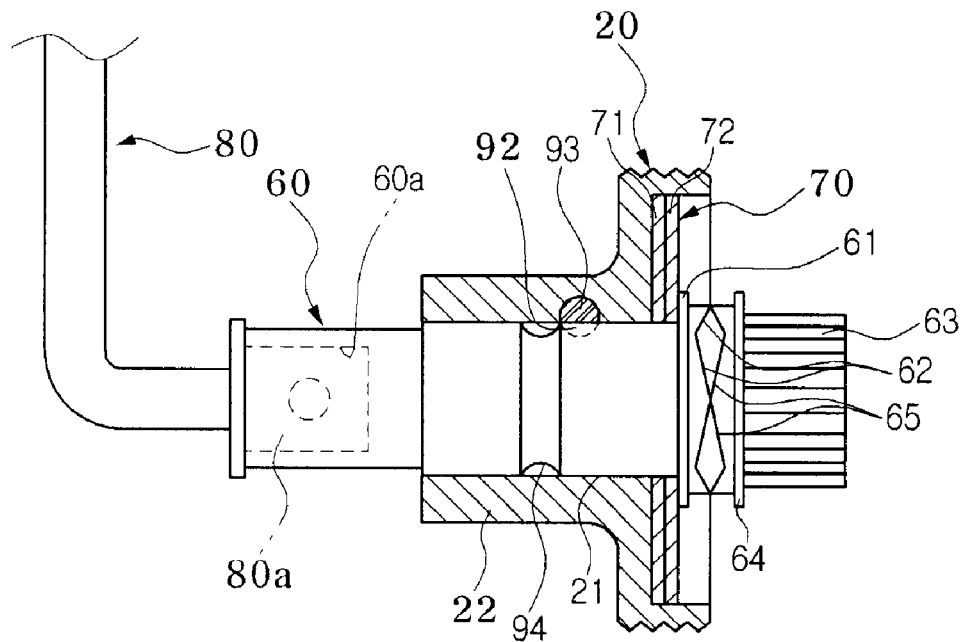
Figure 9:
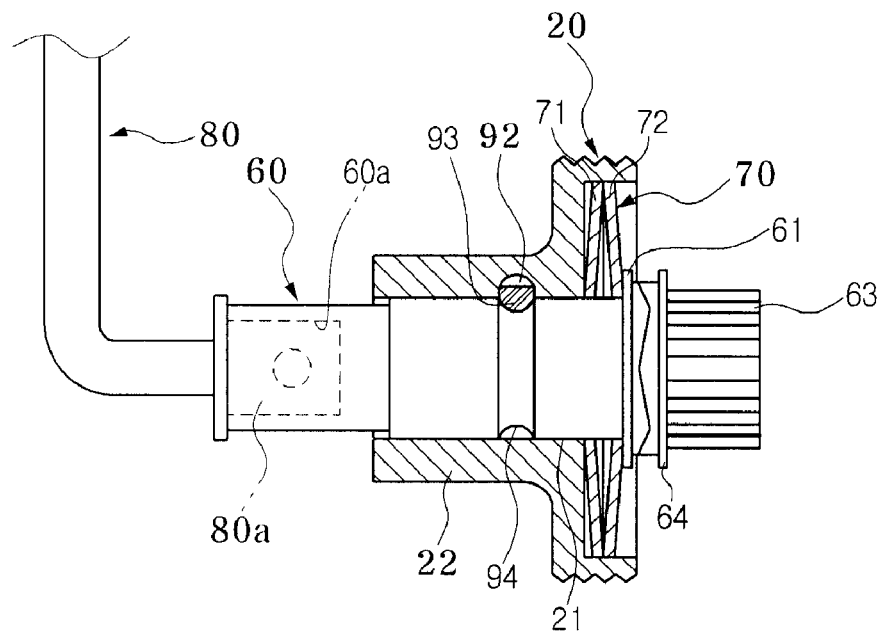

And, if the fixation nut in this invention is perfectly fixed to the object, and the fixation nut is no longer rotated because it is contacted on the wheel surface of a tire, one should rotate the operation handle (80) (80A) more compulsorily than the maximum compression force of the pair of disk spring (71) (72) that composes the elasticity means (70), which results in releasing the convex part (62) of the first operation axis (60) and the convex part (65) of the movable gear (63) from the state of being mutually concave-convex connected, which will induce these parts to mutually contact each other and be moved and finally the first operation axis (60) to be turning idly against the movable gear (refer to the FIG. 7 and the FIG. 8).

Therefore, by immediately recognizing the empty turning of the first operation axis (60) against the movable gear (63) one can realize that the fixation nut is perfectly fixed to an object.

And, when the first operation axis (60) is turning idly against the movable gear (63), the convex part (62) of the first output axis (60) in contact with the convex part (65) of the movable gear (63) makes dull noise, and one can realize by recognizing this noise that the fixation nut is perfectly fixed to an object.

Figure 6:
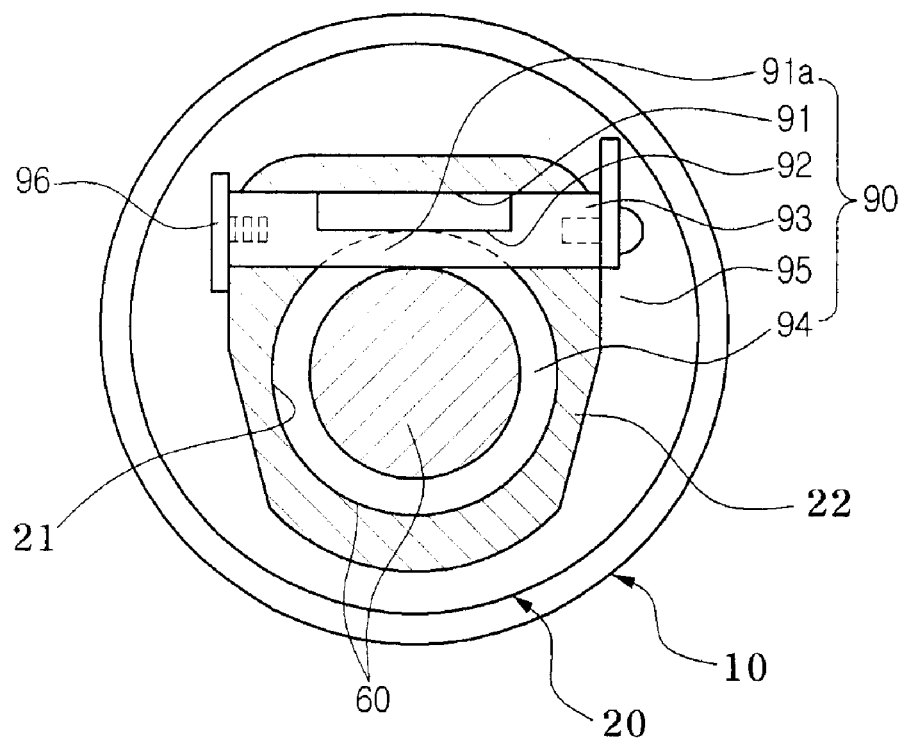

That is to say that as the FIG. 6 illustrates, if by rotating the lever part (93), one part of the lever part (93) is projected into the inside of the turning guiding piercing hole (21) of the cap (20) through the passageway (91a), the line-contacted with the inside of the movement binding groove (94) of the first operation axis (60), the first operation axis (60) cannot move forward and backward inside the rotation guiding piercing hole (21).

After all, the mutual concave-convex connectedness between the convex part (62) of the first operation axis (60) and the convex part (65) of the movable gear (63) can be maintained forcibly. And if one rotates the first operation axis (60), then the inside of the movement binding groove (94) is in contact with the surface of the lever part (93) that is projected into the inside of the turning guiding piercing hole (21) of the cap (20) through the passageway (91a). Therefore, the movable gear (63) can be rotated naturally.

Also, the number of teeth of the internal gear box (11) is greater than the frontal gear (48), and the final output axis (45) is rotated slower according to the difference in the number of teeth of the frontal gear (48) and the internal gear box (11).

So, the frontal gear (48) and the internal gear (11) has the same inside diameter, but as they have different number of teeth, with the internal gear box (11) as the standard, when the many double-planetary gears (79) rotates and revolves around the internal gear box (11) once, the frontal gear (48) will rotate according to the difference in the number of teeth of the two gears.

As mentioned above, the $2^{nd}$ part of the rotational power increase device is as follows.

When the inside diameter of the internal gear box (11) and the frontal gear (48) is the same, and the number of teeth of the internal gear box (11) is 54, and the frontal gear (48), 50, as one tooth of the internal gear box (11) is 6.66 degrees, as the many double-planetary gears (79) rotate around the operational gear (63) once (360 degrees), the frontal gear (48) will rotate with a 4 teeth difference (26.64 degrees).

So, the final output axis (45), connected to the frontal gear (48) will rotate in the same direction as the frontal gear (48), and will rotate the fixed nut through the socket (50)

So, according to the $2^{nd}$ practical application example of this invention, the final output axis (45) can rotate at a greater rotational power, so that it could rotate the fixed nut with less power.

Along so, the rotation direction of the fixed nut is deviated by the rotation direction of the operational gear (63).

Until now, the structure and function of the wrench according to the $1^{st}$ practical application of this invention was explained.

Figure 13:
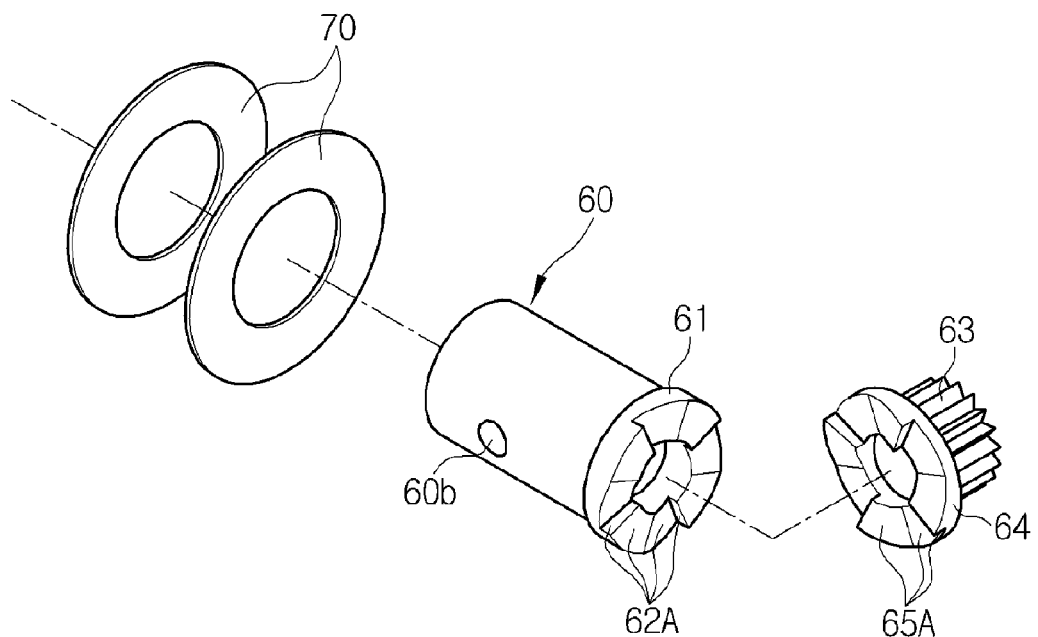
FIG. 13 is a disjointing exploded view that disjoints and illustrates elasticity means and first operation axis and movable gear by the second enforcements example of invention that see FIG. 14 through FIG. 16 is a part extension cross-sectional view that displays operation relation of convex part between elasticity means to be composition that is illustrated to FIG. 13 and first operation axis and movable gear.

The wrench, according to the $2^{nd}$ practical application example of this invention expressed on FIG. 13, is similar to the above explained $1^{st}$ practical application example, but the difference is that the each protrusion (62A) (65A) that compose the initial input axis (60) and operational gear (63) is created to satisfy: condition 6 (refer to FIG. 15), that allows the operational gear (63) to rotate according to the elastic power of the elastic material when the initial input axis (60) is rotated to install the nut; condition 7, which specifies that when the fixed nut installation cannot be continued as it is complete, due to the compression of the elastic device (70), the protrusion (65A) of the operational gear (63) and the protrusion (62A) of the initial input axis (60) moves with mutual contact, and allows the initial input axis (60) to null rotate; and finally condition 8, which specifies that when the above mentioned situation happens, when the initial input axis (60) is rotated the other way to uninstall the fixed nut, the elastic device (70)'s elasticity will rotate the operational gear (63).

However, the protrusion (62A) on the initial input axis (60) is repeatedly created to continuously form on gently slanted, vertical and horizontal plane, and the protrusion (65A) on the operational gear (63) is created to be combined with the protrusion (62A) on the initial input axis (60) correspondingly.

Here, the degree of the above mentioned slant can be created to form a 30 degree with either the exterior of the $1^{st}$ flange (61) or the $2^{nd}$ flange (64). By doing this, the slant and the vertical plan will be of 60 degrees, and the horizontal, 150 degrees. But, the above mentioned slant does not have to be 30 degrees with the $1^{st}$ flange (61) or the $2^{nd}$ flange (64), and can vary.

Figure 14:
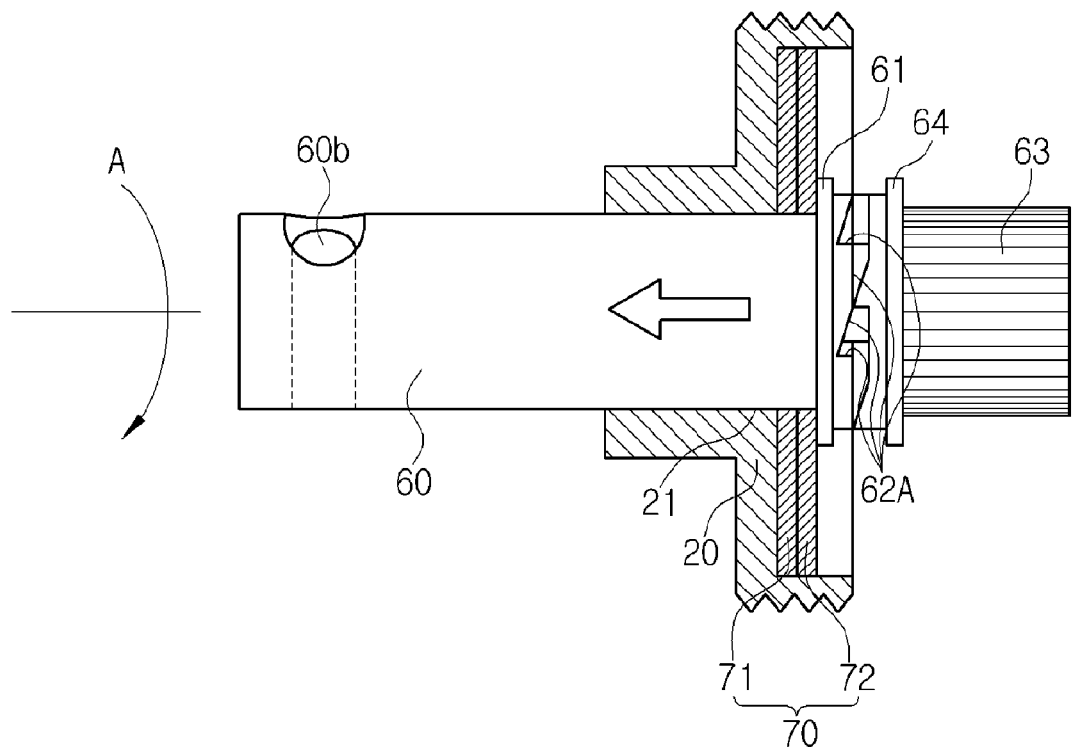
Figure 15:
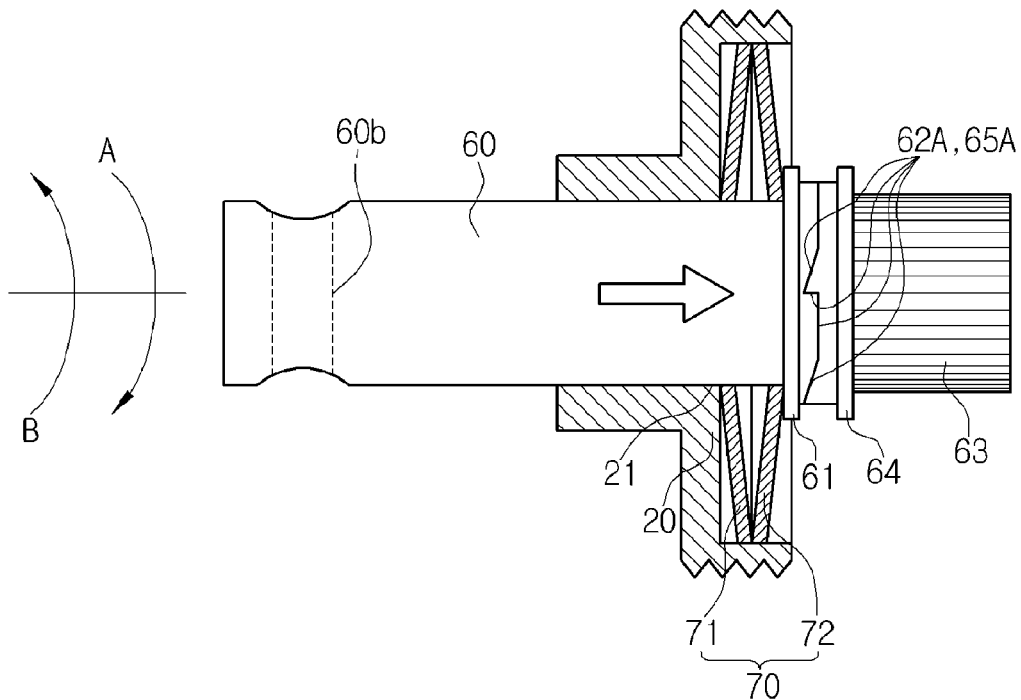
Figure 16:
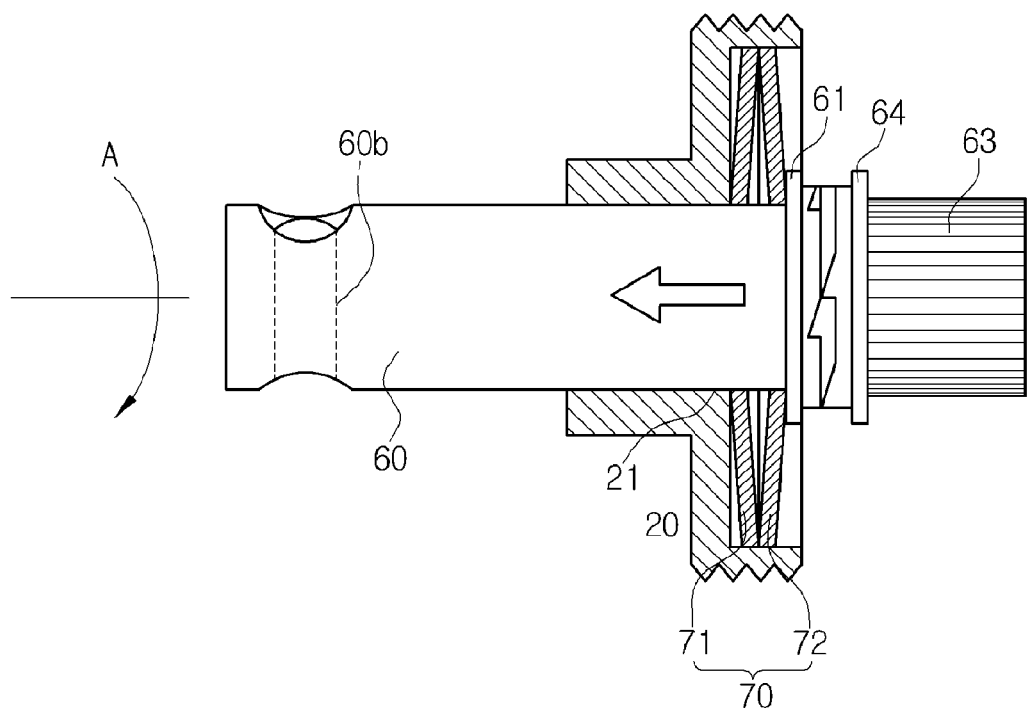

Here, in condition 7, as shown in FIG. 15, when the protrusion (65A) in the operational gear (63) and the protrusion (62A) in the initial input axis (60) is mutually conjoined, and then, as shown in FIG. 14, the two protrusions are moved in mutually conjoined status, and then moves, as shown in FIG. 16, in maximum mutual conjoint, and finally, as shown in FIG. 15, the protrusion (65A) of the operational gear (63) and the protrusion (62A) on the initial input axis (60) returns to its original mutually conjoined status.

So, the process of FIGS. 15->14->16->15 is repeated, and in FIG. 14, the elastic device (70) is compressed to allow the initial input axis (60) to back off in the direction expressed as the arrow, within the rotation guidance hole (21) in the cap (20), and furthermore, as shown in FIG. 16, the initial input axis (60) moves back to its maximum in the direction shown, and then as shown in FIG. 15, the elastic device (70) returns to original, which allows the initial input axis (60) to back off towards the operational gear (63) within the rotation guidance hole (21) of the cap (20).

However, in condition 8, as shown in FIG. 15, if the initial input axis is rotated in the fashion shown by an arrow B, with the protrusion (65A) in the operational gear (63) and the protrusion (62A) of the initial input axis (60) conjoined, as the compression of the above mentioned elastic device (70) and the protrusion (62A) on the initial input axis (60) and the protrusion (65A) in the operational gear (63)'s vertical plane forms a forced obstacle structure, it allows the above mentioned operational gear (63) to rotate, and as a result, when the above mentioned fixed nut cannot proceed due to the tire, the above mentioned nut can be rotated in the way to remove it from the object.

Each protrusion (62A) (65A) that make up the initial input axis (60) and operational gear (63) can be varied in its slant as shown in FIGS. 13, 14, 15 and 16, within the boundaries of satisfying conditions 1, 2 and 3.

Here, in the $2^{nd}$ practical application example of this invention, each protrusion (62A)(65A) that make up the initial input axis (60) and operational gear (63), is of different appearance than in the $1^{st}$ practical application example, as a condition 8, which specifies that when the installing of the above mentioned fixed nut cannot be proceeded due to the contact on the tire surface, when the initial input axis (60) is rotated the other way to uninstall the fixed nut, the elastic device (70)'s elasticity will rotate the operational gear (63), was additionally required to be satisfied.

So, the $2^{nd}$ practical application example, compared to the $1^{st}$, is about a wrench that installs and removes fixed nuts in cases such as installing the wheels of a vehicle which require the installation of many fixed nuts. And, when in operation, the completion status is recognized not by sight but by null rotation status, which allow a maximized convenience.

But, the $2^{nd}$ practical application example can be applied either to the clock-wise or the anticlockwise type in relation to the object, or the fixed nut axis, and can execute the installation and removal of the fixed nut conveniently.

Here, in order to apply either to the clock-wise or the anticlockwise type in relation to the object, or the fixed nut axis, a opposite wrench, that has opposite protrusions (62A) (65A) shown on FIGS. 13, 14, 15 and 16 needs to be created.

Also, the $2^{nd}$ practical application example, when the above mentioned fixed nut is removed from the object when the nut cannot be rotated any more, as each protrusion (62A) (65A) of the initial input axis (60) and operational gear (63) is formed as shown in FIGS. 13, 14, 15 and 16, unlike in the $1^{st}$ practical application example, where you need an initial input axis halt binding/releasing device (90), you can simply change the slant of the slant plane that compose the protrusions (62A) (65)A), so that the fixed nut can be easily removed from the object.

On the other hand, this invention can be used in a device that installs wheels and removes wheels, which require the installation and removal of fixed nuts, along with devices that require the screwing and unscrewing of the fixed bolt.

What is claimed is:

1. A socket wrench comprising:
   a cylindrical case with an open end and a support wall with a rotation guide pass hole, a diameter of which is smaller than that of the said open end;
   a cap detachably connected to the open end of said cylindrical case, said cap having a rotation guide pass hole in its center;
   initial input axis inserted to permit movement back and forth in the rotation guide pass hole of the cap, said initial input axis having a first end and a second end, said first end of the initial input axis positioned inside of the cylindrical case and having a first flange part with jagged outer surface and said second end of the initial input axis positioned outside of said cap being connected to an operation handle;
   an operating gear installed inside the cylindrical case, said operating gear having a gear part on its circular outer surface and having a second flange part with jagged outer surface that allows engaging with the jagged outer surface of the said initial input axis;
   a final rotating axis installed in the rotation guide pass hole of said cylindrical case, said final rotating axis being rotated by torque of the operating gear transmitted through torque increasing means, one end of said final rotating axis protruding out of the rotation guide pass hole and connected to a socket;
   elastic means installed on the outer surface of the initial input axis between said cap and the first flange part for elastically supporting engagement between the jagged outer surface of the first flange part of the initial input axis and the jagged outer surface of the second flange part of the operating gear;
   initial input axis movement binding/release means for selectively enabling and disabling the forward and backward movement of the initial input axis while enabling rotation of the initial input axis;

wherein the incline angle comprising the jagged outer surfaces of the initial input axis and the operating gear meets a condition in which when tightening nuts or bolts to an object, the operating gears will rotate together with the initial input axis with the jagged outer surfaces engaged due to the elastic force of the elastic means, and when the nuts or bolts are tightened to said object, the jagged outer surfaces disengage, overcoming the elastic force of the elastic means.

2. The socket wrench of claim 1, wherein said elastic means comprises a pair of disk springs with a piercing hole through which the initial input axis passes, the disk springs being formed tapered to have central parts of them be separated and edges of them be contacted.

3. The socket wrench of claim 1, wherein the initial input axis movement binding/release means comprises a piercing hole formed in the cap in an orthogonal direction of the initial input axis, said piercing hole forming a passageway communicating with the rotation guide pass hole of the cap;

a lever part installed rotatably in the piercing hole with both ends of said lever part projected outside of the cap, said lever part having a concave part not to be interfered with inside circular area of the rotation guide pass hole in a first rotation state;

formed around the outer surface of the initial input axis, said movement binding groove selectively contacting the lever part in accordance with the rotation state of the lever part;

wherein when said lever part is rotated in a second rotation state its outward surface is projected into the movement binding groove and the forward and backward movement of the initial input axis is disabled, and when the lever part is the first rotation state with the concave part directed toward the movement binding groove, the forward and backward movement of the initial input axis is enabled.

\* \* \* \* \*